Patented Oct. 30, 1934

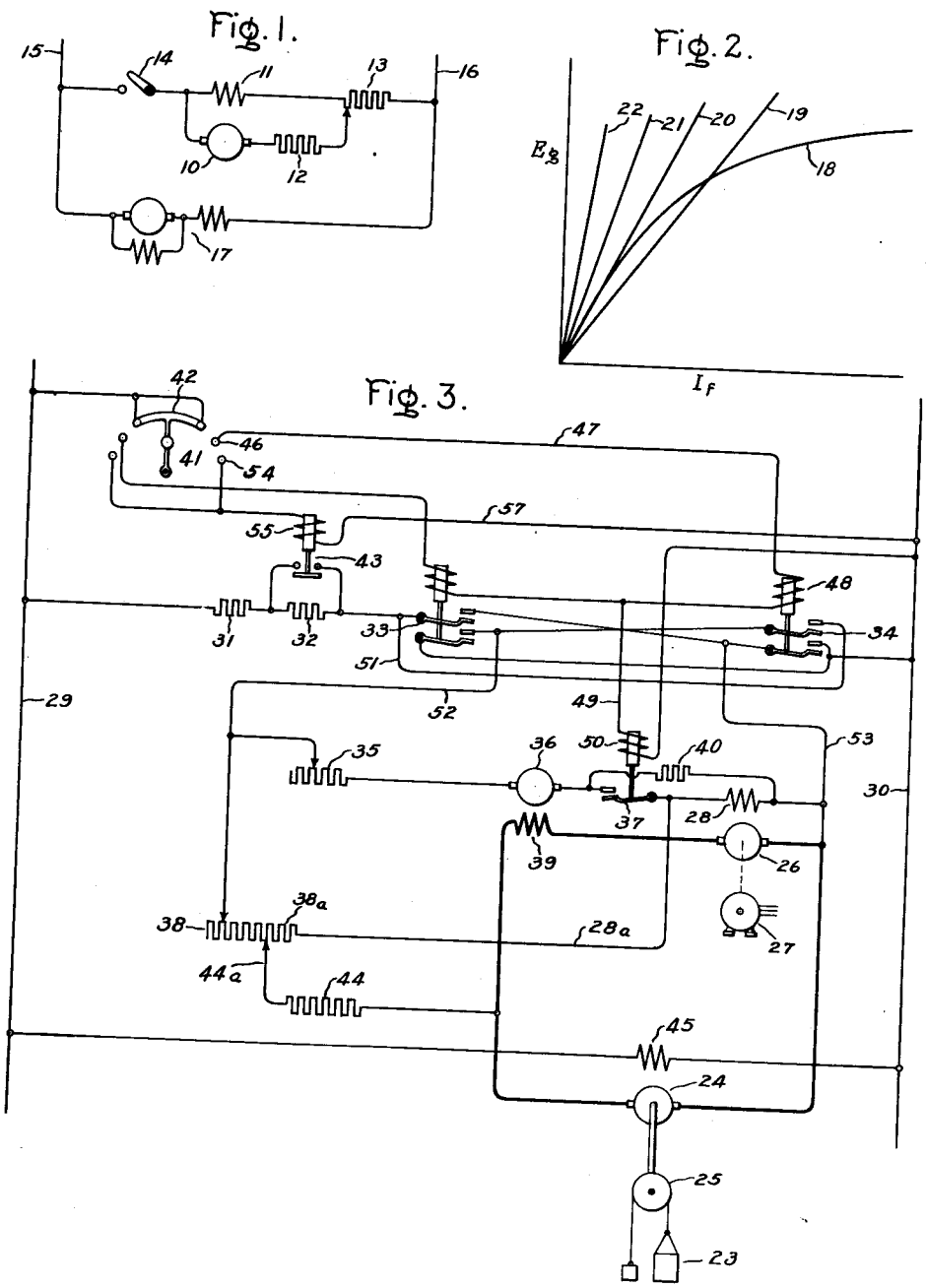

1,979,102

UNITED STATES PATENT OFFICE

1,979,102

CONTROLLING RATE OF ACCELERATION AND RETARDATION OF ELEVATOR EQUIPMENT

John Eaton, Schenectady, N. Y., assignor to General Electric Company, a corporation of New York Application August 21, 1931, Serial No. 558,522

11 Claims. (Cl. 172—239)

My invention relates to electrical control systems, and more particularly to control systems for the field windings of dynamo-electric machines, and has for an object the provision of a simple, reliable and inexpensive means for positively controlling the rates of rise and decay in the magnetism of a dynamo-electric machine.

More specifically, my invention relates to Ward-Leonard systems in which the direction and speed of rotation of an electric motor are controlled by varying the excitation and hence the voltage of the generator from which it is supplied. In the operation of Ward-Leonard systems, it is very frequently desirable both during the accelerating and decelerating periods of the motor, to limit the rate of change in speed of the motor to a maximum permissible value and to provide that this maximum rate of change in speed shall be attained gradually. Furthermore, it is desirable that the means employed to attain these results should be simple in order not to require undue experience or caution on the part of the operator or the employment of complicated systems of electromagnetic devices and the like for automatically controlling the generator excitation.

Heretofore, in the operation of motor control systems of this type the rates of rise and decay of the magnetic field of the generator have been inherently limited by the inductance of the generator field circuit. However, when the Ward-Leonard system is applied for driving electric passenger elevators and the like, relatively small machines are used, and for a relatively small machine it is difficult and often impracticable to design the magnetic circuit of the generator sufficiently inductive to limit the rates of rise and decay of the generator field to desired values. It will of course be understood that if the rates of acceleration and retardation of the elevator are too great, there is a consequent discomfort suffered by the passengers and the apparatus itself is subject to abuse.

In carrying out my invention, I decrease the rates of rise and decay of the magnetism and hence the voltage of the generator to a greater degree than the inherent rates of rise and decay imposed by the inductance of the field winding. In one form of my invention, the field winding of the generator is connected across the armature of the generator to an auxiliary source of excitation current through suitable resistance devices, so that on the initial operation a part of the excitation current supplied from the auxiliary supply source is by-passed through the armature of the generator; while the remainder of the supplied excitation current flows through the field winding and is sufficient to start the building up of the generator voltage. As the generator voltage rises, the by-passed current is gradually decreased to zero, the rising generator voltage thereafter causing additional excitation current to be supplied to the field winding. As the magnetic circuit of the generator becomes saturated the rate of increase of excitation current supplied from the generator decreases inasmuch as the generator voltage is then increasing at a relatively low rate. By varying the values of the resistance devices the rates of rise and decay of the generator voltage or the rates of acceleration and retardation of the elevator may be controlled over a considerable operating range below the maximum permissible rates.

For a more complete understanding of my invention reference should now be had to the drawing, in which Fig. 1 is an elementary diagram of an excitation control system embodying my invention and Fig. 2 represents a characteristic curve of the generator shown in Fig. 1 together with various resistance lines for the field circuit of the generator, and Fig. 3 is a simplified diagrammatic representation of a system of elevator control embodying my invention.

Referring now to Fig. 1 of the drawing, I have shown my invention in one form as applied to a generator 10 provided with a field winding 11. To control the rates of rise and decay of the magnetism of the generator, the field winding 11 is connected across the armature of the generator 10 through a resistance device 12, and through a resistance device 13 and a switch 14 to supply lines 15 and 16 leading from a substantially constant voltage direct current supply source shown as a compound wound exciter 17. The amount of opposition offered to the flow of current by the resistance devices 12 and 13 has an important relation to the rates of rise and decay of the magnetism of the generator 10. This relation will be more readily understood by assuming that the generator 10 is being rotated at constant speed and that the switch 14 is closed. Current will thereupon flow through a circuit leading from the supply line 15 through the switch 14, dividing between the winding 11, and the armature of the generator 10 connected in series with the resistance device 12, and thence through the resistance device 13 to the other supply line 16. The total amount of current taken from the supply lines 15 and 16 is limited by the resistance device 13 and the proportion of the excitation current by-passed around the winding 11 through the generator armature and the resistance device 12 may be controlled by varying the opposition offered by the resistance device 12 to the flow of current.

As already explained, upon the closing of the switch 14, excitation current flows through the winding 11 which initiates the building up of the voltage on the generator 10. The rising voltage of generator 10 first decreases the by-passed current to zero and thereafter furnishes additional excitation current for the winding 11. It will thus be observed that if both the resistance devices 12 and 13 offer relatively little resistance to the flow of current, the rate of rise of the voltage on generator 10 will be high. However, if the resistance device 12 offers less resistance to current flow than the resistance of the field winding 11 it will be understood that a larger proportion of the current will be by-passed through the armature of the generator 10 with consequent reduction in the amount of excitation current which may initially flow through the winding 11. The result is a much slower rise of the magnetism of the generator 10.

Assuming that the switch 14 is open and the sum of the resistances of the field winding 11 and the resistance device 12 is less than a critical value for the generator 10, the generator voltage will rise due to its residual magnetism. This phenomenon is well known in the art and I have shown a typical no load saturation curve 18 of the generator 10 in Fig. 2 illustrating the rise of voltage $E_g$ of the generator 10 with increase of field current $I_f$. Inasmuch as the resistance of the field winding 11 and the resistance device 12 is equal to the voltage applied across them divided by the current flowing through them, one value of resistance may be represented by a straight line shown in Fig. 2 as the straight line 19 and higher values of resistance for this circuit are indicated by the straight lines 20 and 21 and 22. As is well understood in the art, the fact that the resistance line 19 intersects the curve 18 indicates that the generator voltage will rise due to the effect of the residual magnetism. However, if the resistance of the circuit is increased by increasing the resistance of the resistance device 12 to the point represented by the line 21, it is also well understood that the generator voltage will not rise. If the resistance of the field circuit is adjusted to its critical value as represented by the line 20 which is tangent to the lower part of the curve 18, the generator will be operating in what has been termed "indifferent equilibrium." In other words, the rise of voltage on the generator is indeterminate and the value of voltage which will be generated at a given time for this value of resistance may not easily be predicted. I prefer to adjust the resistance device 12 so that the resistance of the circuit is represented by such a resistance line as is indicated at 21 which is greater than the critical value of resistance as represented by the line 20.

It will thus be observed that an auxiliary source of excitation must be provided to initiate the building up of the generator voltage and if the auxiliary source of excitation is disconnected at any time the fact that the resistance of the field winding circuit is above the critical value insures the decay of the generator voltage or in other words prevents the generator from maintaining a constant value of voltage across its armature.

If it now be assumed that the switch 14 is opened, it will be observed that the excitation of the field winding 11 of the generator 10 is entirely supplied by the generator 10, and inasmuch as the resistance of the resistance device 12 is of sufficiently great magnitude to prevent the generator 10 from supplying sufficient excitation current to the winding 11 to maintain a voltage on the generator, the voltage of the generator immediately begins to decay. The rate of decay will be decreased considerably over the limitation imposed by the inductance of the field winding 11, inasmuch as excitation current continues to be supplied by the generator 10 to the field 11 after the switch 14 has been opened.

In applying my invention to the control of the rates of rise and decay of the generator magnetism for the control of the rates of acceleration and retardation of an elevator, I connect the elevator driving motor in a local circuit with a generator supplying current to the motor. Inasmuch as the $I^2R$ losses in the generator and motor armatures cause a considerable decrease in elevator speed for a heavy load of the elevator, I prefer to include a speed regulator or exciter energized in accordance with the load current exchanged between the generator and the motor, and connected by means of a potentiometer arrangement to the field winding of the generator. To control the rates of acceleration and deceleration of the elevator, the field winding of the generator is connected across the generator armature through a resistance as described in connection with Figs. 1 and 2. The circuit through the armature of the generator also provides an additional path for excitation current from the exciter and by varying the adjustment of the potentiometer in conjunction with the resistance in the armature circuit of the generator to the field winding of the generator, I provide means for adjusting the component of excitation supplied by the exciter without affecting the several speeds at which the elevator may be operated, each of which speeds of the elevator is determined by a fixed amount of resistance in series with the potentiometer, the field winding and an auxiliary source of supply.

Referring now to Fig. 3, I have shown my invention as applied to the control of an elevator 23, raised and lowered by a motor 24 which has a suitable driving connection with the traction sheave 25, about which the supporting cables are wound. Although not shown it will be understood that the shaft of the motor will be provided with a suitable brake drum and a co-operating mechanical brake. These elements are so well understood in the art that it is deemed advisable for the purpose of simplifying the drawing to omit a showing of them. The motor 24 is connected in a Ward-Leonard system to a generator 26 driven by a suitable alternating current motor 27. The operations of the motor are controlled by varying the excitation of a field winding 28 provided on the generator 26. To secure the desired regulation of the motor under varying operating conditions through the control of the excitation of the generator field winding, I provide an auxiliary direct current source of excitation indicated by the supply lines 29 and 30, which is connected to the field winding 28 through a fixed resistance 31 and a speed controlling resistance 32; the electromagnetic direction controlling switches 33 and 34 through a parallel circuit, one path of which includes an adjustable resistance 35, a speed regulator or exciter 36, and a normally open electromagnetically operated switch 37; the other path including an adjustable resistance 38. A field winding 39 provided on the exciter 36 is connected in series with the armature of the generator 26 and serves to energize the exciter in accordance with the load current exchanged between the armatures of the generator 26 and the driving motor 24, thereby causing the exciter to supply a component of excitation to the field winding 28. This component of excitation may be varied by increasing or decreasing the values of the resistances 35 and 38.

The exciter 36 by means of the switch 37 and a relatively high resistance 40 also provides suicide connections for the generator 26. The suicide connections, i. e., connections for causing the voltage generated by the generator due to its residual magnetism to weaken or to kill the residual magnetism thereof, are described and claimed in my copending application Ser. No. 382,465, filed July 31, 1929, patented August 25, 1931, No. 1,820,786, entitled "Motor control system."

A manually operable car switch 41 provided with a pivotally mounted electrically conducting segment 42, serves to selectively energize the direction controlling switches 33 and 34 and to operate a switch 43 connected in shunt with the speed controlling resistance 32.

As described in connection with Fig. 1, the rates of rise and decay of the generator voltage are controlled by connecting the generator field winding 28 in parallel circuit with the generator armature, the circuit including more resistance than the critical value of resistance of the generator. As shown, this resistance includes a section 38a of the resistance 38 and an additional resistance 44.

With the above understanding of the elements comprising an embodiment of my invention, the operation of the system itself will be readily understood from the detailed description which follows: It will be assumed that the armature of the generator 26 and the armature of the exciter 36 which may be mounted upon the shaft of the generator 26, are being driven by a suitable driving means shown as the alternating current motor 27, and that the separately excited field winding 45 of the driving motor 24 is energized across the supply lines 29 and 30. If it be desired to cause the motor 24 to rotate in such a direction as to drive the elevator car 23 in an upward direction, the car switch 41 will be operated in a clockwise direction from its central position to its first operative position in which it engages the stationary contact member 46 to complete a circuit extending from the supply line 29, through the segment 42, contact 46, conductor 47, an operating coil 48 provided on the direction controlling switch 34, conductor 49 to an operating coil 50 provided on the switch 37 and to the other supply line 30. The direction controlling switch 34 and the switch 37 thereupon close establishing an energizing circuit for the field winding 28 of the generator 26 from the auxiliary source of excitation 29 and 30, which circuit may be traced from the supply line 29, fixed resistance 31, speed controlling resistance 32, conductor 51, the upper contact of the switch 34, conductor 52, through the parallel circuit, one path including resistance 35, exciter 36, and the switch 37, the other path including the resistance 38 and conductor 28a, thence through the field winding 28, conductor 53, lower contact of switch 34 and to the other supply line 30. It will be remembered that the field winding 28 is connected across the armature of the generator 26 by means of conductor 28b, section 38a of the resistance 38 and the resistance 44. Therefore on the first instant after the establishment of the circuit from the auxiliary source of excitation, a part of the current is shunted from the field winding 28 through the resistance 44 and the armature of the generator 26. The rates of acceleration and retardation of the elevator 23 are largely controlled by the resistance 44. In order to insure the decay of the generator voltage when the auxiliary source of excitation is disconnected, the resistance 44 should never be less than the critical value of resistance for the generator 26. In fact, I prefer that the sum of the section 38a of the resistance 38 and the resistance 44 should be considerably greater than the critical value of resistance for the generator 26, for the reasons pointed out in connection with Fig. 1. It will of course be understood that sufficient current may flow through the resistances 35 and 38 to the field winding 28 to initiate the rise of the generator voltage. The rising voltage of the generator decreases the by-passed current to zero, and thereafter supplies additional excitation current to the field winding 28. I have found that the rate of the rise of the magnetism and hence the voltage of the generator in terms of elevator acceleration is thereby controlled to a predetermined desired rate. I have also found that by varying the value of the resistance 44, different rates of acceleration may be obtained which are suitable for elevator systems.

Of course it will be obvious to those skilled in the art, once the principle of my invention has been explained, that the resistance values selected will vary for machines having different operating characteristics. In one installation where the critical value of resistance of the generator was 40 ohms, the desired rates of acceleration and retardation of the elevator were obtained by giving the resistance 44 a value of 85 ohms while the resistances 35, 38 forming the exciter potentiometer were respectively adjusted to 20 ohms and to 40 ohms. A speed controlling resistance 32 of 300 ohms served to fix the low speed of the elevator, and a fixed resistance 31 permanently in circuit had a resistance of 37 ohms. A resistance 40 of 400 ohms provided for the suicide connections. The desired resistance of the field circuit may of course be obtained by selecting a high resistance conductor for the field winding 28 of the generator. However as shown my invention has great flexibility and may be applied to existing installations without a redesign of the generator.

The exciter 36 is connected to boost the excitation current supplied from the auxiliary source and from the generator armature 26. It will be observed that the exciter 36 may supply a component of excitation to the field winding 28 through the auxiliary source of direct current supply and also through the armature of the generator 26. By providing these two parallel circuits for the excitation current supplied by the exciter 36 and, in addition, a circuit through the resistance 38, I have found that the component of excitation supplied from the exciter 36 may be adjusted to compensate for the $I^2R$ losses for high speed and full load and low speed and full load of the elevator without affecting the predetermined speeds of the elevator 23. The speed of the elevator 23 is determined by the voltage applied by the generator 26 to the motor 24, which voltage is determined by the value of excitation current supplied to the field winding 28. Under the conditions assumed the amount of excitation current which may flow from the supply line 29 is determined by the sum of the resistances 31 and 32, the equivalent series resistance of the resistances 35 and 38, and the resistance of the field winding 28. Therefore, if the ratio of the resistances 35 and 38 is maintained constant, the excitation current supplied from the auxiliary source will remain constant though the corrective component of excitation supplied by the exciter 36 to the field winding 28 for a given operating condition may be varied.

To operate the elevator at full speed the car switch 41 is moved in a clockwise direction until the conducting segment 42 engages the contact 54 thereby completing an energizing circuit from the supply line 29 through an operating coil 55 of the switch 43 connected in shunt with the resistance 32, and by conductor 57 to the other supply line 30. The switch 43 thereupon closes short circuiting the speed controlling resistance 32, thereby increasing the excitation and hence the voltage of the generator 26. The rate of rise of the voltage of the generator 26 and consequently the rate of acceleration of the elevator 23 is again limited inasmuch as the effect of the increased voltage from the supply lines 29 and 30 is to decrease the component of excitation current supplied by the generator 26 on the first instant, the rising voltage of the generator thereafter causing the excitation current to increase. It will thus be observed that I not only control the rate of acceleration of the motor of the elevator 23 from rest, but that I also control the acceleration of the elevator 23 from low speed to full speed.

It should further be observed that the exciter 36 may now increase the component of excitation supplied to the field winding 28 through the external source inasmuch as the resistance 32 has now been short circuited, thereby providing a circuit which is of less resistance than the circuit through the armature of the generator 26. Furthermore the effect of increasing the voltage across the conductors 52 and 53 is to increase the voltage across the resistance 38 which diminishes the exciter current shunted from the field winding 28 through the resistance 38. It will thus be observed that circuits are provided for the exciter 36 which permit it to supply the proper component of excitation for both low speed and full load of the elevator and for high speed and full load of the elevator.

When it is desired to stop the elevator car at any desired floor, the car switch 41 will be thrown to the central or neutral position, the effect of which will be to deenergize the coils 48, 50 and 55. Deenergization of these coils permits the normally open switches 34, 37 and 43 to open, which switches function to reinsert the resistance 32, to disconnect the field winding 28 from the supply lines 29 and 30, and to establish the suicide connections for the generator 26. As a result of the deenergization of the coil 50 the mechanical brake (not shown) is allowed to grip the brake drum to bring the elevator to standstill. It is to be observed, however, that the generator 26 is still connected to supply excitation current to the field winding 28 through a circuit which may be traced from one side of the generator armature through the winding 39, the resistance 44, through the right hand portion 38a of the resistance 38, the field winding 28 and to the other side of the generator armature. The resulting effect is to tend to maintain the voltage of the generator 26 thereby decreasing the normal rate of decay of the generator field 28. It will be remembered that the resistance 44 is sufficiently great to insure the decay of the magnetism of the generator; that is to say, the excitation current which may be supplied from the generator 26 is limited to a value insufficient to maintain the excitation and voltage of the generator, though it does serve to decrease the rate of decay of the generator magnetism within predetermined limits and consequently to decrease the rate of deceleration of the elevator.

It will also be remembered that the suicide connections cause the voltage generated by the generator due to its residual magnetism to weaken. This is accomplished by the opening of the switch 37 which causes current to flow through a circuit which may be traced from one side of the exciter armature through resistance 40, field winding 28, conductor 28a, resistance 38, resistance 35, and to the other side of the armature of the exciter. It will thus be observed that the current which flows through the field winding 28 is reversed with respect to its former flow and hence if current circulates between the generator 26 and the motor 24 the exciter 36 is energized to supply excitation current to the field winding 28 in a direction to weaken or to kill the residual magnetism.

Inasmuch as the exciter armature is connected in a circuit within the direction controlling switches, the polarity of the exciter is caused to be correct for all of the various conditions which must be met; that is, when the motor 24 is rotating in a direction to hoist the elevator or in a direction to lower the elevator.

If it be desired to cause the elevator car to be lowered, the car switch 41 may be operated from its central or neutral position in a counterclockwise direction and the operation will be the same as already described for the hoisting of the car, as will be readily understood by persons skilled in the art; the sole difference in the operation being that the direction controlling switch 33 will be operated to the closed position in response to the energization of its operating coil and that reversed polarity will be applied to the field winding 28 of the generator, the result of which will be to cause the generator to deliver current to the motor 24 in the reverse direction, and to cause the motor 24 to drive the elevator car in a downward direction.

Further movement of the car switch 41 in a counterclockwise direction causes the switch 43 to be operated to the closed position thereby short circuiting the speed controlling resistance 32 and as described for the hoisting of the car the elevator is accelerated at a predetermined rate to its full speed.

While I have shown a particular embodiment of my invention, it will be understood of course that I do not wish to be limited thereto, since many modifications may be made and I therefore contemplate in the appended claims to cover any such modifications as fall within the true spirit and scope of my invention.

What I claim as new and desire to secure by Letters Patent of the United States, is:

1. An elevator control system comprising a driving motor, a supply generator therefor provided with a field winding, means for decreasing the rates of rise and decay of the generator magnetism to a greater degree than the inherent rates of rise and decay imposed by the inductance of the field winding comprising, a resistance device, connections for connecting said field winding in series with said device and the armature of said generator, an auxiliary source of supply for supplying excitation current to said field winding, and means for limiting the current supplied from said source to a predetermined value.

2. In combination, a motor, a supply generator therefor provided with a field winding connected in shunt circuit relation with the armature of said generator, the resistance of said field circuit being greater than the critical resistance of said generator, an auxiliary source of excitation current connected to said field winding circuit to initiate the rise of voltage of said generator whereby the ratio of current supplied from said source and from said generator armature is automatically varied to limit the rate of rise of said generator voltage within predetermined limits.

3. In combination, a motor, means for controlling the acceleration of said motor comprising a generator provided with a field winding connected in parallel circuit with the armature of said generator, means for supplying auxiliary current to said parallel circuit, means for causing sufficient current to flow through the field winding path of said circuit to initiate the rise of voltage in said generator, the remainder of said current being by-passed through the armature path of said parallel circuit, and means for limiting the additional excitation current produced by the rise in voltage in said generator to a value insufficient for said generator alone to maintain its excitation whereby the rates of rise and decay of said generator voltage are automatically controlled within predetermined limits to determine the rate of motor acceleration.

4. In combination a generator, a load circuit therefor, a field winding for said generator connected in parallel circuit with its armature, supply means for supplying auxiliary current to said parallel circuit, the said auxiliary current dividing through the field winding path and through the armature path of said parallel circuit, current limiting means connected in said armature path for causing sufficient current to flow through the field winding path of said parallel circuit to initiate the rise of voltage of said generator, the said rising voltage decreasing the flow of auxiliary current through the armature path of said parallel circuit to zero, and thereafter supplying additional excitation current from said generator to said field winding the said current limiting means limiting the additional excitation current produced by the rising voltage of said generator to a value insufficient for said generator alone to maintain its excitation, an auxiliary generator responsive to the current in said load circuit for supplying an additional component of excitation to said field winding whereby the rates of rise and decay of said generator voltage are automatically controlled within predetermined limits irrespective of the load on said generator.

5. In combination a Ward-Leonard control system for elevators including a generator having a field winding arranged to be jointly excited from an auxiliary source of supply and from said generator, a resistance connected between said field winding and said source of supply, a motor connected to said generator, resistance means connected between said generator field winding and said generator to cause sufficient current from said auxiliary source of supply to flow through said field winding to initiate the building up of voltage of said generator the said resistance means limiting the excitation current supplied from said generator to prevent the maintenance of said generator voltage due to the excitation current supplied from said generator, whereby the rates of rise and decay of the voltage of said generator are automatically controlled within predetermined limits.

6. In combination a Ward-Leonard control system including a generator connected in local circuit with a motor, a field winding for said generator connected through a resistance in parallel circuit with said generator the said resistance being of such value as to limit the excitation current supplied from said generator to prevent the rise of voltage of said generator due to its residual magnetism, an auxiliary excitation circuit for supplying auxiliary excitation current to said generator field winding to initiate the rise of said generator voltage, and a resistance connected in said auxiliary excitation circuit for limiting the current therein to a predetermined value, whereby the ratio of excitation current supplied from said auxiliary excitation circuit and from said generator is automatically controlled to limit the rates of rise and decay of said generator voltage.

7. In a Ward-Leonard control system, the combination with a generator provided with a field winding connected through a resistance across the armature of said generator, an exciter, a field winding therefor responsive to the generator current, a second resistance, a separate source of excitation connected to said generator field winding through a portion of said second resistance and said exciter, and connections forming a circuit for said exciter including said resistances and the armature of said generator, whereby said exciter may maintain a component of excitation through said armature circuit.

8. In a Ward-Leonard control system, the combination with a generator provided with a field winding connected in circuit with the armature of said generator, means for increasing the resistance of said circuit above the critical value of said generator, an exciter, a field winding therefor responsive to the generator current, an adjustable resistance in series with the armature of said exciter, a second adjustable resistance, a separate source of excitation connected to both of said resistances and to one side of said generator field winding, connections for said second resistance for connecting it in parallel with said first mentioned resistance and the armature of said exciter and to the other side of said generator field winding, whereby the component of excitation supplied by said exciter may be varied to compensate for the $I^2R$ losses on full load and high speed and low speed and full load.

9. A Ward-Leonard control system including a generator connected in local circuit with a driving motor, an exciter energized in accordance with the exchange of load current between said generator and said motor, an adjustable resistance, an auxiliary source of excitation, a field winding for said generator connected in circuit with the armature of said exciter and said resistance to said auxiliary source of excitation, a second adjustable resistance connected in parallel with said first mentioned resistance and said exciter armature, and a circuit for said field winding through said local circuit, means for increasing the resistance of said last mentioned circuit above the critical value of resistance of the generator, the said resistances providing an adjustment of the component of excitation supplied from said exciter independently of the component of excitation supplied by said auxiliary source.

10. In combination, a motor, a generator, the armature of which is connected in local circuit with the motor, a field winding for said generator, an auxiliary source of excitation for said field winding, speed controlling resistances, an exciter, an adjustable resistor, connections for connecting said field winding in series circuit with said exciter, said speed controlling resistances and with said adjustable resistor, a second adjustable resistor connected in parallel with said exciter and said first adjustable resistor, means responsive to the load current of said generator for producing excitation on said exciter, said variable resistors providing adjusting means for controlling the component of excitation supplied by said exciter without affecting the excitation current supplied from said auxiliary source as determined by said speed controlling resistances.

11. In combination, a motor, a generator, the armature of which is connected in local circuit with said motor, a field winding for said generator, an auxiliary source of excitation for said field winding, speed controlling resistances, an exciter provided with a field winding energized in accordance with the current in said local circuit, an adjustable resistor, connections for connecting said generator field winding in series circuit with said exciter, said speed controlling resistances, said adjustable resistor and with said auxiliary source, a second adjustable resistor connected in parallel with said exciter and said first adjustable resistor, connections for connecting said generator field winding in parallel circuit relation with the armature of said generator, said circuit having a resistance above the critical resistance value of said generator whereby the rates of acceleration of said motor are automatically controlled and the $I^2R$ losses of said local circuit are compensated for by said exciter.

JOHN EATON.